UNITED STATES PATENT OFFICE.

JOHN A. SCHARWATH, OF BROOKLYN, NEW YORK.

FIRE AND WATER PROOF COMPOSITION AND PROCESS OF PREPARING THE SAME.

1,136,370. Specification of Letters Patent. Patented Apr. 20, 1915.

No Drawing. Application filed April 10, 1913. Serial No. 760,229.

*To all whom it may concern:*

Be it known that I, JOHN A. SCHARWATH, a citizen of the United States, and a resident of Brooklyn, county of Kings, and State of New York, have invented certain new and useful Improvements in Fire and Water Proof Compositions and Processes of Preparing the Same, of which the following is a specification.

My invention relates to fire-proofing materials and compositions.

One of its objects is to provide means for treating an improved material of this character that shall be both fire and water-proof.

Another object of my invention is to provide a composition of matter with which paper, textile fabrics, wood, cardboard and the like may be treated and rendered fire-proof and impervious to moisture.

Other objects and advantages of my invention will be set forth hereinafter.

I shall now describe my invention in detail and shall then point out the features of novelty in appended claims.

In the treatment of materials such as those enumerated above, I first prepare a bath composed of a solution of liquid silicate of soda with which is mixed fire clay and oxid of manganese. There is also preferably included relatively small quantities of red oxid of manganese and oxid of magnesia.

The following proportions have been found to be desirable:

Substance. Parts by weight.

Water _____ 300
Silicate of soda____ 150 (liquid).
Fire-clay _____ 125
Oxid of manganese 50 (powder).
Red oxid of manganese _____ 10 (powder).
Oxid of magnesia__ 10 (powder).

The above ingredients are agitated and then ground in a liquid grinding machine as for example a paint grinder.

When the bath is prepared the articles to be rendered fire and water proof, of any desirable form or shape, are dipped into it, remaining immersed long enough for the liquid to soak into the material of which the articles are composed. The permeated articles are then either baked in an oven at a temperature varying from 300 degrees F. to 500 degrees F. which causes the materials to flux and unite chemically or are thoroughly dried at a temperature of about 130 degrees F. The treated articles are preferably dipped a second time in the bath and baked or dried as before. Finally the articles thus treated are dipped in a solution of oxid of magnesia and chlorid of magnesia. After this dipping the articles are dried at a temperature sufficient to remove all superfluous moisture. This treatment permeates and coats the articles with a stone-like substance which renders them fire-proof and also forms an outside coating which resembles stone which renders them not only impervious to moisture but is also uninfluenced by sulfur or ammonia fumes or gases and is not attacked by hydrofluoric acid. The final treatment is by no means independent of the previous treatment and in fact I believe it is valueless if used alone.

The essential ingredients of the first coating are silicate of soda and water and one or more of the other ingredients may be omitted without destroying the usefulness of the final product. The addition of red oxid of manganese is intended to produce a desired color in the final product and may of course be replaced by some other suitable material or omitted entirely.

Asbestos and various other materials may be treated as above specified but it is not necessary to use as a foundation a material which is more or less fire-proof in order to produce a fire-proof and water-proof final product. Articles of wood, paper, cloth or other inflammable materials are rendered perfectly fire-proof by the hereindescribed process. The composite coating of my invention is also particularly desirable because it is unaffected by hot water.

While my improved composition is particularly well adapted for use in preparing linings for smokestacks, breechings and the like and for covering pipes and joints which are exposed to heat and to the weather, it may be utilized for various other purposes within the spirit and scope of my invention.

What I claim is:

1. The process of rendering an article fire-proof and water-proof that consists in treating the article with a solution composed of silicate of soda, fire clay and oxid of manganese, baking the article and finally treating the article in a second solution adapted to combine with the first solution to produce a surface coating of hard stone-like fire-proof material that is impervious to moisture.

2. The process of rendering an article fire-proof and water-proof that consists in treating the article with a solution composed of silicate of soda, fire clay and oxid of manganese, baking the article and finally treating the article in a solution composed of oxid of magnesia and chlorid of magnesia.

3. The process of rendering an article fire-proof and water-proof that consists in dipping the article in a bath composed of a solution of silicate of soda, fire clay and oxid of manganese, baking the article to unite the ingredients and finally dipping the treated article in a solution composed of oxid of magnesia and chlorid of magnesia.

4. The process of rendering an article fire-proof and water-proof that consists in dipping the article in a bath composed of silicate of soda, fire clay and oxid of manganese ground in water, baking the article at a temperature between 300° and 500° F. to dry out, flux and unite the ingredients, then dipping the treated article in a bath composed of a solution of oxid of magnesia and chlorid of magnesia.

5. A fire and water-proof article composed of an absorbent material, filled and covered with a fluxed and hardened compound consisting of silicate of soda, fire clay and oxid of manganese having a coating consisting of the aforesaid filling and covering compound in combination with a compound consisting of oxid of magnesia and chlorid of magnesia.

6. A fire and water-proof article composed of an absorbent material filled and covered with a fluxed and hardened compound consisting of silicate of soda, fire clay, oxid of manganese, red oxid of manganese and oxid of magnesia and having a coating consisting of the aforesaid filling and covering compound in combination with a compound consisting of oxid of magnesia and chlorid of magnesia.

7. A fire and water-proof article composed of an absorbent material filled and covered with a fluxed and hardened compound consisting of relatively large proportions of silicate of soda and fire clay, relatively small proportions of red oxid of manganese and oxid of magnesia and a medium proportion of oxid of manganese and having a coating consisting of the aforesaid filling and covering compound in combination with a compound consisting of oxid of magnesia and chlorid of magnesia.

8. A fire and water-proof article composed of an absorbent material filled and covered with a fluxed and hardened compound consisting of parts by weight substantially as follows: of silicate of soda 150, fire clay 125, oxid of manganese 50, red oxid of manganese 10 and oxid of magnesia 10, and having a coating consisting of the aforesaid filling and covering compound in combination with a compound consisting of oxid of magnesia and chlorid of magnesia.

9. A fire and water-proof article composed of an absorbent material filled and covered with dried and hardened silicate of soda and having an outer coating composed of oxid of magnesia and chlorid of magnesia.

In witness whereof I have hereunto set my hand this 8th day of April, 1913.

JOHN A. SCHARWATH.

Witnesses:
K. SCHARWATH,
E. T. CONNELL.